(12) United States Patent
Ionescu et al.

(10) Patent No.: US 9,069,863 B2
(45) Date of Patent: Jun. 30, 2015

(54) IDENTIFYING UNKNOWN PARAMETER AND NAME VALUE PAIRS

(75) Inventors: Paul Ionescu, Ottawa (CA); Iosif V. Onut, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 13/269,838

(22) Filed: Oct. 10, 2011

(65) Prior Publication Data

US 2013/0091152 A1    Apr. 11, 2013

(51) Int. Cl.
  *G06F 17/30*   (2006.01)
  *G06F 7/24*    (2006.01)

(52) U.S. Cl.
  CPC .... *G06F 17/30867* (2013.01); *G06F 17/30861* (2013.01); *G06F 7/24* (2013.01)

(58) Field of Classification Search
  CPC ..................... G06F 17/30867; G06F 17/30861
  USPC .......................................................... 707/754
  See application file for complete search history.

(56) References Cited

U.S. PATENT DOCUMENTS

| 7,143,359 B2 | 11/2006 | Aggarwal et al. |
| 7,308,648 B1 * | 12/2007 | Buchthal et al. ............... 715/234 |
| 7,617,233 B2 | 11/2009 | Guido et al. |
| 7,788,293 B2 | 8/2010 | Pasztor et al. |
| 7,870,482 B2 | 1/2011 | Gnech et al. |
| 2007/0050196 A1 * | 3/2007 | Jadhav et al. ...................... 705/1 |
| 2010/0269032 A1 | 10/2010 | King et al. |

OTHER PUBLICATIONS

Halfond, et al.; "Automated Identification of Parameter Mismatches in Web Applications"; SIGSOFT 2008/FSE-16 Proceedings of the 16th ACM SIGSOFT International Symposium on Foundations of Software Engineering; p. 1-11; Nov. 9-15, 2008.

* cited by examiner

*Primary Examiner* — Alexey Shmatov
(74) *Attorney, Agent, or Firm* — Cantor Colburn LLP; Ryan Lewis (57) ABSTRACT

Identifying parameter and name/value pair separators within two or more strings of data. The identifying is performed by selecting at least one name/value pair separator candidate from the two or more strings of data, and filtering the at least one name/value pair separator candidate using one or more rules, thereby removing any of the name/value pair separator candidates that do not conform to any of the one or more rules. The identifying additionally includes selecting at least one parameter separator candidate from the two or more strings of data, and filtering the at least one parameter separator candidate using one or more rules, thereby removing any of the at least one parameter separator candidates that do not conform to any of the one or more rules. The result is a set of tuples that includes a name/value separator candidate, and a parameter separator candidate.

16 Claims, 4 Drawing Sheets

IDENTIFYING UNKNOWN PARAMETER AND NAME VALUE PAIRS

BACKGROUND

This invention relates generally to processing within a computing environment, and more particularly to identifying unknown parameter and name value pairs.

The advent of asynchronous JavaScript and XML (Ajax) and rich Internet applications has transformed the way information is exchanged between a browser and a web server. Before Ajax the most common way to send information to a web application was via a form submittal, today there are an infinite number of combinations of parameter formats and data transfer standards.

For example before the introduction of Ajax, to make a login page, the developer would use a form which would contain at least two input fields: a user name and a password and a submit button.

```
<form action="login.jsp" method="POST">
    <input type="text" name="user"/></br>
    <input type="password" name="pass"/></br>
    <input type="submit" value="Submit"/></br>
</form>
```

When the submit button is clicked the browser transforms this form and the information populated by the user within it, into a HTTP request which would transmit the parameters as "uid=jsmith&passw=Demo1234&btnSubmit=Login."
These parameters were delimited using standard characters "=" for name and value separators, and "&" for parameter separators.

After Ajax was introduced the requirement to use an actual web form was eliminated because JavaScript within the page is able to manipulate and submit HTTP requests. In addition, both the HTML itself and the HTTP request being sent to the server have changed. Using, for example, JavaScript Object Notation (JSON) formatted JavaScript submission with the same parameters will be transmitted as "["uid":"jsmith", "pass":"Demo1234"]" over an XMLHTTPRequest JavaScript function.

The use of JSON is not required, and therefore developers are free to transmit data in any format using the XMLHTTPRequest JavaScript function. Since the format of parameters is now left to the ingenuity of the JavaScript developers various variations of parameter configurations are possible. Another example is the use of XML to parameterize data such as "<uid>jsmith</uid><pass>Demo1234</pass>." Any other character or set of characters may be used to separate parameters, and name/value pairs from one another.

BRIEF SUMMARY

Additional features and advantages are realized through the techniques of the present invention. Other embodiments and aspects of the invention are described in detail herein and are considered a part of the claimed invention. For a better understanding of the invention with advantages and features, refer to the description and to the drawings.

An embodiment of the invention includes a method for identifying parameter and name/value pair separators. The method includes receiving two or more strings of data, wherein each of the two or more strings of data include at least one separator. The method additionally includes selecting at least one name/value pair separator candidate from the two or more strings of data. The method further includes filtering the at least one name/value pair separator candidate using one or more rules, thereby removing any of the name/value pair separator candidates that do not conform to any of the one or more rules. The method additionally includes selecting at least one parameter separator candidate from the two or more strings of data, and filtering the at least one parameter separator candidate using one or more rules. The filtering removing any of the at least one parameter separator candidates that do not conform to any of the one or more rules. The method further includes creating a set of tuples, wherein each tuple in the set of tuples includes a name/value separator candidate, and a parameter separator candidate.

An additional embodiment includes a system for identifying parameter and name/value pair separators. The system receives two or more strings of data, wherein each of the two or more strings of data include at least one separator. The system further selects at least one name/value pair separator candidate from the two or more strings of data, and filters the at least one name/value pair separator candidate using one or more rules, thereby removing any of the name/value pair separator candidates that do not conform to any of the one or more rules. The system additionally selects at least one parameter separator candidate from the two or more strings of data, and filters the at least one parameter separator candidate using one or more rules. The filtering removing any of the at least one parameter separator candidates that do not conform to any of the one or more rules. The system additionally creates a set of tuples, wherein each tuple in the set of tuples includes a name/value separator candidate, and a parameter separator candidate.

A further embodiment includes a computer program product for identifying parameter and name/value pair separators. The computer program product performs a method that includes receiving two or more strings of data, wherein each of the two or more strings of data include at least one separator. The method additionally includes selecting at least one name/value pair separator candidate from the two or more strings of data. The method further includes filtering the at least one name/value pair separator candidate using one or more rules, thereby removing any of the name/value pair separator candidates that do not conform to any of the one or more rules. The method additionally includes selecting at least one parameter separator candidate from the two or more strings of data, and filtering the at least one parameter separator candidate using one or more rules. The filtering removing any of the at least one parameter separator candidates that do not conform to any of the one or more rules. The method further includes creating a set of tuples, wherein each tuple in the set of tuples includes a name/value separator candidate, and a parameter separator candidate.

BRIEF DESCRIPTION OF THE SEVERAL VIEWS OF THE DRAWINGS

Referring now to the drawings wherein like elements are numbered alike in the several FIGURES.

DETAILED DESCRIPTION

An embodiment of the present invention provides a system, method and computer program product for identifying unknown parameter name value pairs.

In an embodiment, text is received that includes a number of web components with unknown name/value pair, and parameter separators. The web components are compared to one another using a text comparison algorithm, and a set of potential name/value pair separators is identified based on a series of rules. Once the set of potential name/value pair separators is identified, they are used to identify parameter separators using the text comparison algorithm, and another set of rules. Potential name/value separators that are not consistent with the rules are eliminated, and one or more sets of name/value and parameter tuples are selected as potential separators.

The variety of parameter formats introduced by Ajax introduces a challenge for web application security testing, and complicates testing and web application development. A web security scanner may be implemented to test vulnerabilities in web applications. A web security scanner has a predefined list of known parameter formats sometimes identified by name value and parameter separator pairs. If a Web Scanner encounters an Ajax request that uses an unknown parameter format it will be unable to correctly test that request for security issues.

An example of security test that needs to be executed is authentication bypass using SQL Injection. SQL injection is an attempt by someone trying to access secure data on in a web application by shaping parameters such that they include SQL query components that fool the web application into returning data that is not intended to be returned on a particular page. For a web security scanner to properly test for SQL injection vulnerabilities it must know the format for name/value pairs including the name/value pair separator and the parameter separator. Missing such vulnerabilities may be extremely costly for a company, and therefore a solution to automatically identify the parameter format is beneficial in modern complex web applications.

Although the aspects of the invention have been described as implemented in a web security scanner, it will be understood that aspects of the invention may be implemented in any situation in which the identification of separators in data is required, including implementations beyond web based data transmissions.

Figure 1:
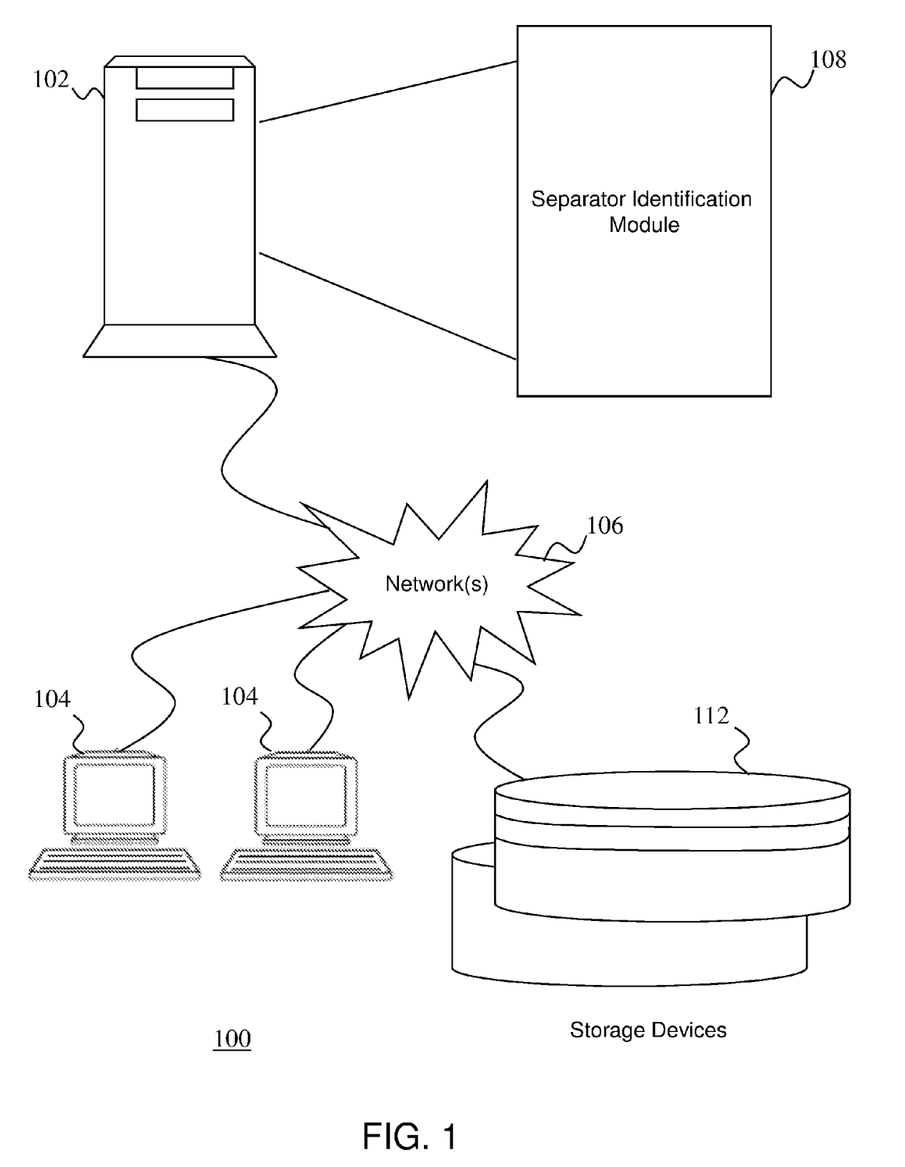
FIG. 1 depicts a schematic diagram of a system for identifying unknown parameter name value pairs that may be implemented by an embodiment.

Turning now to FIG. 1, a system 100 for identifying unknown parameter and name value pairs will now be described. In an embodiment, the system 100 includes a host system computer 102 executing computer instructions for identifying unknown parameter and name value pairs. Host system computer 102 may operate in any type of environment that is capable of executing a software application. Host system computer 102 may comprise a high-speed computer processing device, such as a mainframe computer, to manage the volume of operations governed by an entity for which the unknown parameter and name value pairs identification is executing. In an embodiment, the host system computer 102 is part of an enterprise (e.g., a commercial business) that implements a identifying unknown parameter and name value pairs system.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) of the unknown parameter and name value pairs identification system described herein.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 executing a user interface application (e.g., a web browser) to contact the host system computer 102 through the networks 106. In another embodiment, the client system 104 is connected directly (i.e., not through the networks 106) to the host system computer 102 and the host system computer 102 contains memory for storing data in support of identifying unknown parameter and name value pairs. Alternatively, a separate storage device (e.g., storage device 112) may be implemented for this purpose.

In an embodiment, the storage device 112 includes a data repository with data relating to the identification of unknown parameter and name value pairs by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an embodiment, the storage device 112 includes one or more databases containing, e.g., and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the identification of unknown parameter and name value pairs. The host system computer 102 includes a separator identification module 108 for identifying unknown parameter and name value pairs. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the system for identifying of unknown parameter and name value pairs described in FIG. 1 may be implemented in hardware, software executing on a general purpose computer, or a combination thereof.

Figure 2:
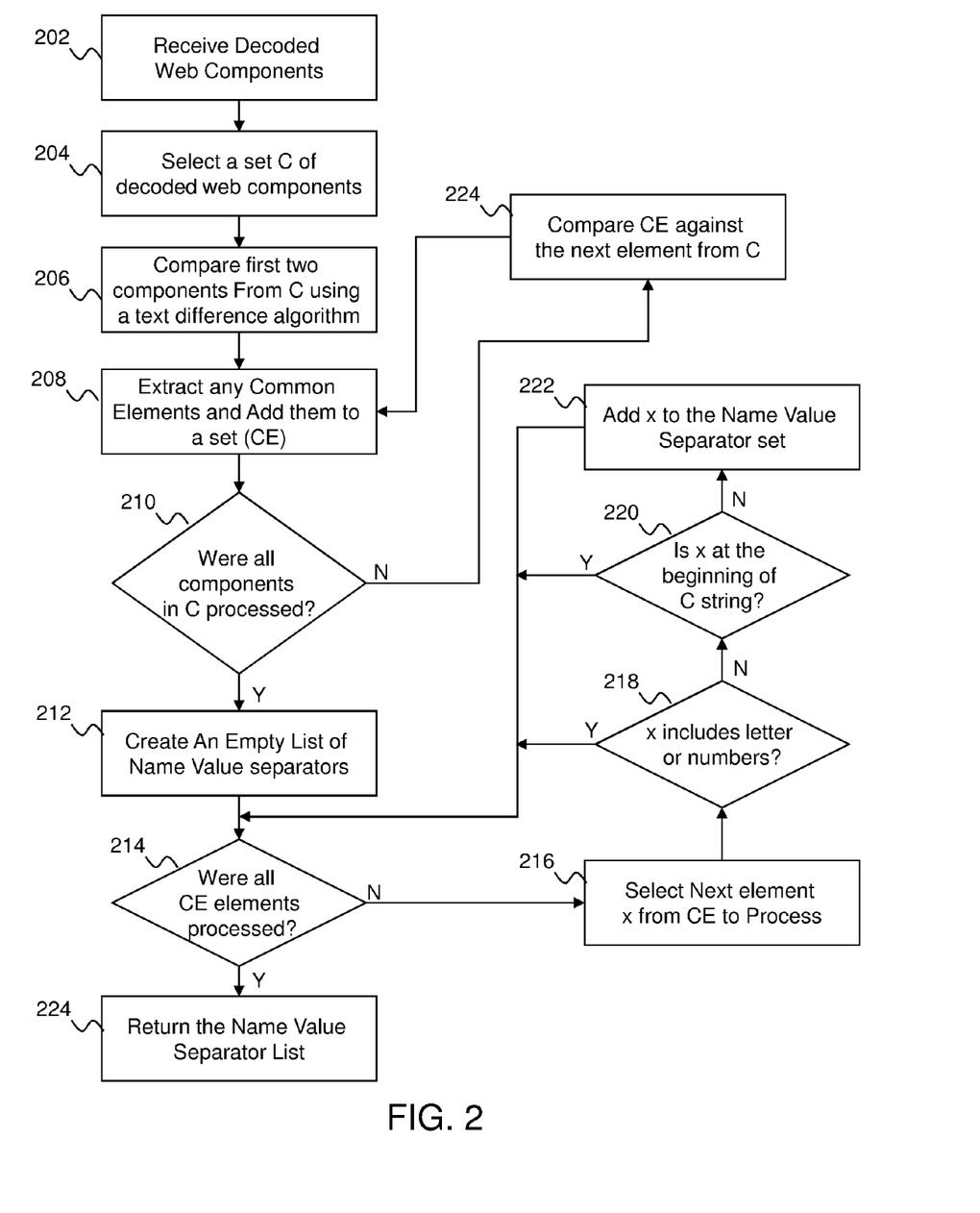
FIG. 2 depicts a process flow for determining the name/value pair separators candidates for a set of text strings in an embodiment.

FIG. 2 depicts a process flow for determining the name/value pair separator candidates for a set of text strings in an embodiment. The process flow of FIG. 2 may be implemented in, for example, the separator identification module 108 of FIG. 1. At block 202, two or more decoded web components are received. In an embodiment, the decoded web components are strings of characters that have been stripped of any control information and that contain at least one name/value pair and a separator. In an embodiment, the web components are query strings stripped from a web query, or post data strings as is known in the art. At block 204, a set C of decoded web components are selected. The set of C components may be all or a subset of the received decoded web components.

At block 204, the first two of the web components from set C are selected and are compared using a text difference algorithm. In an embodiment, a largest common sequence difference algorithm is used, however any algorithm suitable for identifying sets of characters common to two strings may be used. At block 208, common elements identified in the two compared web components are added to a common element set (CE). At block 210, it is determined if all of the web components from the set C have been processed. If not all of the web components from the set C have been processed, then processing continues at block 224, where the elements in the CE set are compared against the next uncompared element in C. Processing then continues at block 208. Otherwise, if all of the web components in C have been processed processing continues at block 212. At block 212, an empty list of name/value separators is created.

At block 214, it is determined if all of the elements in the CE set have been processed. If there are additional elements in the CE set, then processing continues at block 216. At block 216, the next element in the CE set is selected for processing at block 218. At block 218, it is determined if the selected element includes letters within it. Separators generally do not contain letters and numbers because it would require that the separators be further delimited or escaped in order for them to be distinguished from the names and values that they delimit. If the selected element does not contain letters or numbers, then processing continues at block 220. At block 220, it is determined if the element is at the beginning of the string of data in the web component. A name/value pair delimiter is unlikely to occur at the beginning of the string of name/value pairs. If the element does not occur at the beginning of the web component then processing continues at block 222. At block 222, the element is added to the name/value separator set created at block 212 and processing continues at block 214.

Returning to block 220, if the element is at the beginning of the web component, then the element is discarded and processing continues at block 214. Returning to block 218, if the element includes letters or numbers, then the element is discarded and processing continues at block 214. Returning to block 214, if all of the CE elements have been processed, then at block 224 the name/value set for the web components is returned as candidate name/value pair separators.

Figure 3A:
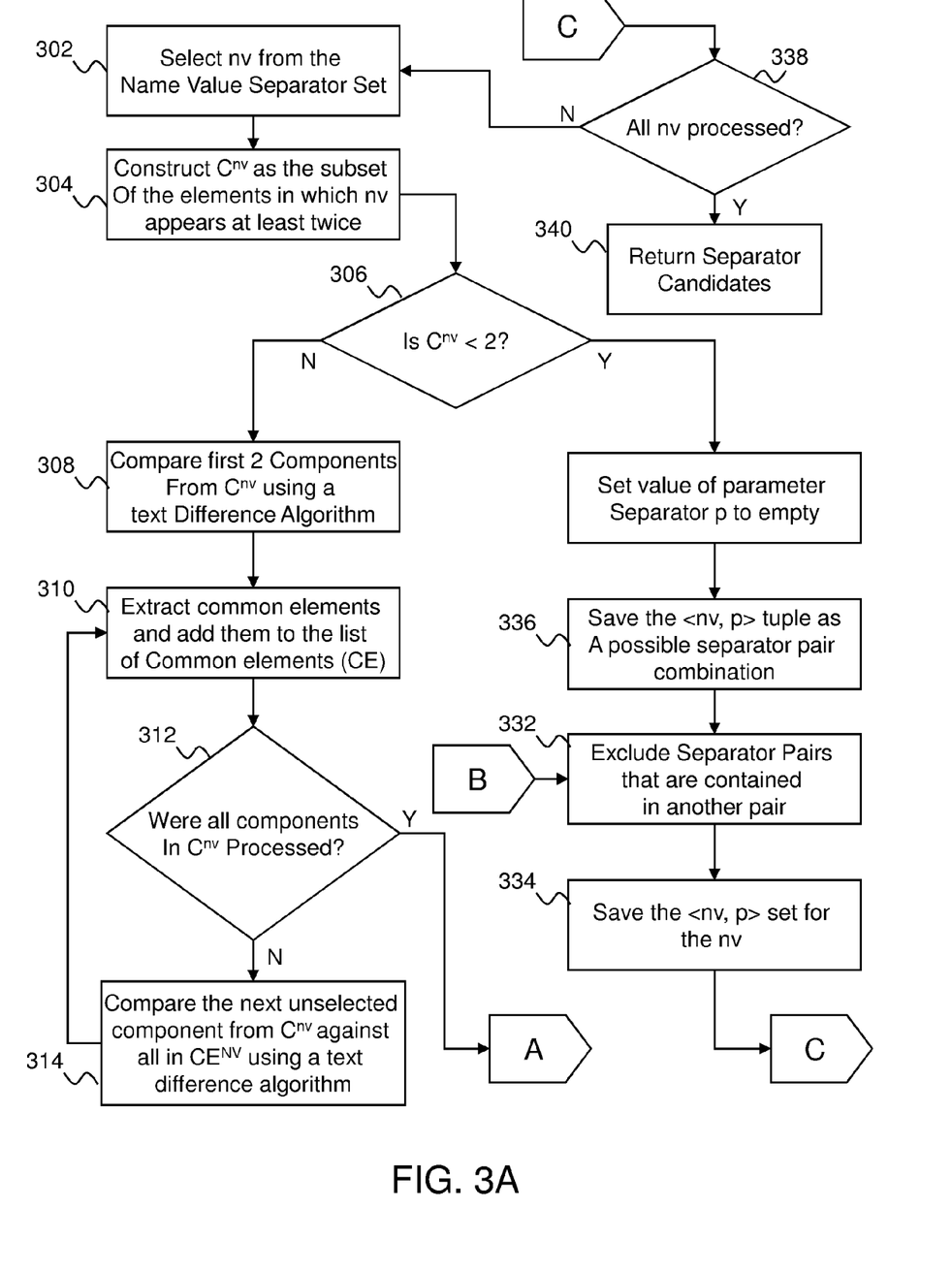
FIGS. 3A-3B depict a process flow for determining the name/value pair separator, and parameter separator set candidates for a set of text strings in an embodiment.
Figure 3B:
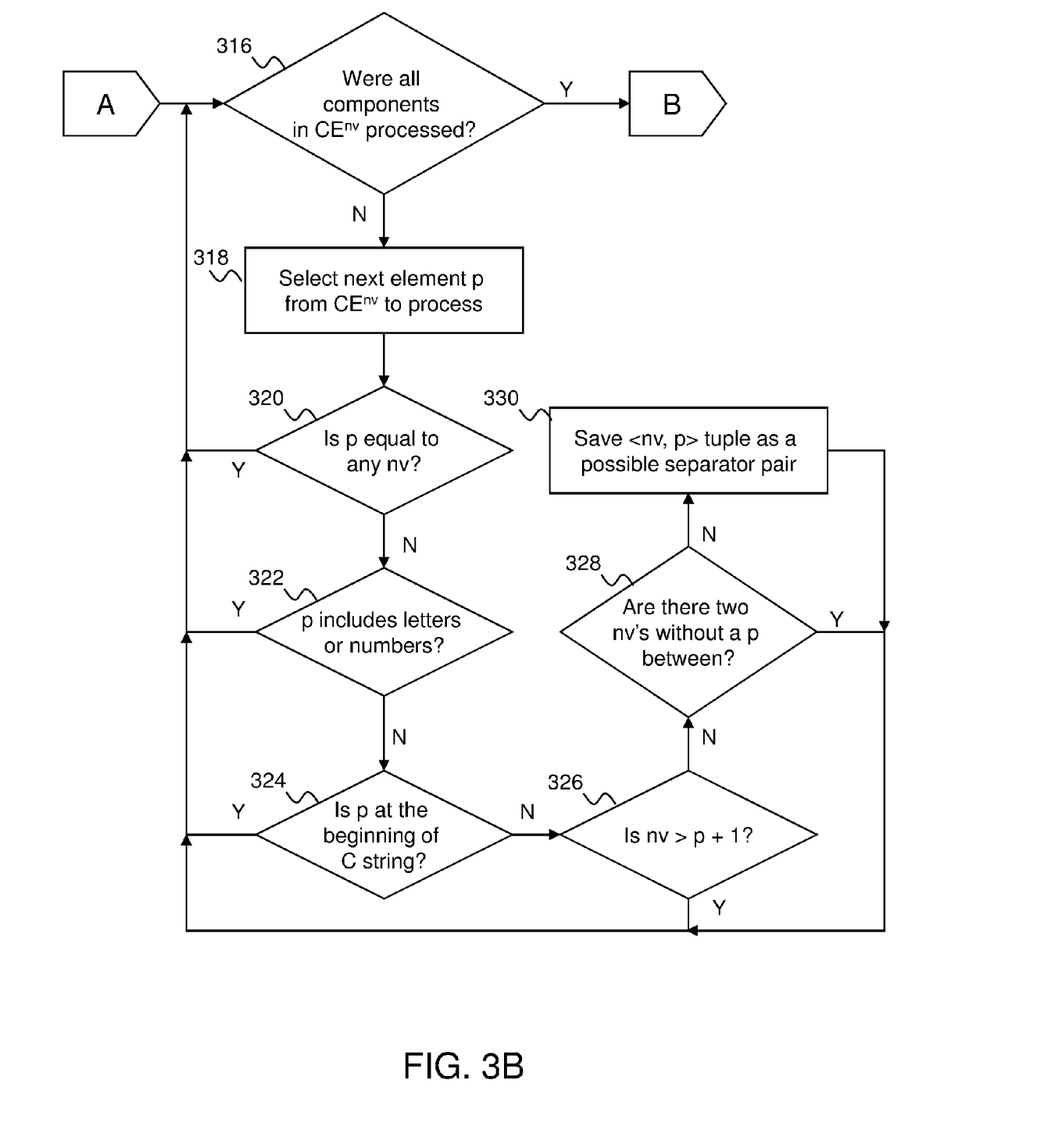

FIGS. 3A-3B depict a process flow for determining the name/value pair separator, and parameter separator set candidates for a set of text strings in an embodiment. The process flow of FIGS. 3A-3B may be implemented in, for example, the separator identification module 108 of FIG. 1. At block 302, a name/value pair separator candidate is selected from the candidate name/value pair separator set created in FIG. 2 above. At block 304, a new set $C^{nv}$ is created from the set of web components that include the name/value pair separator at least twice. At block 306, it is determined if the set $C^{nv}$ includes at least two components. If there are at least two components in the set $C^{nv}$ then processing continues at block 308. At block 308, the first two components in the set $C^{nv}$ are compared using a difference algorithm as described above with regard to FIG. 2. At block 310, common elements identified in the two compared components are added to a common element set CE and processing continues at block 312. At block 312, it is determined if all of the components in the set $C^{nv}$ have been processed. If not all of the components in the set $C^{nv}$ have been processed, then processing continues at block 310.

Otherwise processing continues at block 316 of FIG. 3B. At block 316, it is determined if all of the elements in the set $C^{nv}$ have been processed. If not all of the elements in the set $C^{nv}$ have been processed, then processing continues at block 318. At block 318, an element p is selected from the set $C^{nv}$. At block 320, it is determined if the element p is equal to any of the name/value separator candidates identified previously. It is unlikely that a parameter separator would be the same as the name/value pair separator. Therefore, if there is a match, then p is discarded and processing continues at block 316. Otherwise processing continues at block 322. At block 322 it is determined if the element p includes letters or numbers. As stated above, it is unlikely that a separator would include letters or numbers, therefore, if the element p includes letters or numbers, then it is discarded and processing continues at block 316.

Otherwise processing continues at block 324. At block 324, it is determined if p is at the beginning of any of the web components. As stated above, it is unlikely that a separator will appear at the beginning of a web component, therefore, if the element p is found at the beginning of any of the web components, then the element p is discarded and processing continues at block 316. Otherwise processing continues at block 326. At block 326, it is determined if any of the potential name/value pair candidates occur more often than the element p occurs in the web component +1. Typically, since each name value pair is separated from each other name value pairs by at least one parameter separator, if the name/value pair separator occurs n times, then p should occur at least n−1 times. Therefore if the name/value pair separator candidate occurs more often then the p separator occurs +1 then the p element is discarded, and processing continues at block 316.

Otherwise, processing continues at block 328. At block 328, it is determined if two name/value pair separator candidates appear consecutively without the element p between them. If two name/value pairs appear together without the element p between them, then p is not likely to be a parameter separator, because parameter separators, by definition, separate each of the name/value pairs from one another. Therefore, if there are two name/value pair candidates that are not separated by the element p, then processing continues at block 316. Otherwise processing continues at block 330. At block 330, the name/value separator candidate, and the selected p are added as a tuple to a possible separator pair set and processing continues at block 316.

Returning to block 316, if all of the elements $CE'''$ have been processed, then processing continues at block 332 of FIG. 3A. At block 332, the set of possible separator pairs is reviewed, and any pairs that are contained in other pairs are excluded from the list. At block 334, the remaining possible separator pair tuples are saved and processing continues at block 338. At block 338, it is determined if all of the name/value pair separator candidates have been processed. If not all of the name/value pair candidates have been processed, then processing continues at block 302, where the next name value pair is selected. Otherwise, if all of the name/value pair candidates have been processed, then the name/value pair and separator tuples are returned as separator candidates at block 340.

Returning to block 306, if the set $C'''$ includes at less than two components, then processing continues at block 338. At block 338, the parameter separator p is set to empty. At block 336, the name/value pair candidate and the empty parameter separator tuple is saved as a potential candidate and processing continues at block 332.

In an embodiment, the separator candidates are used to by a web security scanner to test a web application.

Technical effects and benefits include determining name/value pair and parameter separators using an automated method without requiring knowledge of what the separator values are. An additional benefit includes the generation of a set of name/value and parameter separator tuples that may be used to verify and test data in a web application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method, comprising:
   receiving, on a computer, two or more strings of data, each of the two or more strings of data including at least one separator;
   selecting, on the computer, at least one name/value pair separator candidate from the two or more strings of data;
   filtering, on the computer, the at least one name/value pair separator candidate using one or more rules, the filtering removing any of the at least one name/value pair separator candidates that do not conform to any of the one or more rules;
   selecting, on the computer, at least one parameter separator candidate from the two or more strings of data;
   filtering, on the computer, the at least one parameter separator candidate using one or more rules, the filtering removing any of the at least one parameter separator candidates that do not conform to any of the one or more rules; and
   creating, on the computer, a set of tuples, each tuple in the set of tuples comprising a remaining name/value pair separator candidate, and a remaining parameter separator candidate;
   wherein the remaining name/value pair separator candidate remains after the filtering, on the computer, the at least one name/value pair separator candidate using the one or more rules;
   wherein the remaining parameter separator remains after the filtering, on the computer, the at least one parameter separator candidate using the one or more rules.

2. The method of claim 1, wherein the two or more strings of data are character strings of data containing one or more unknown separators, and the two or more strings of data are data submitted to a web application over a network connection.

3. The method of claim 1, wherein the selecting comprises using a difference algorithm to identify one or more characters in common between each of the two or more strings of data.

4. The method of claim 1, wherein the one or more rules for filtering the at least one name/value pair separator candidate and the at least one parameter separator candidate comprises determining if the any of the at least one name/value pair separator candidates or the at least one parameter separator candidate is one of a letter, and a number.

5. The method of claim 1, wherein the one or more rules for filtering the at least one name/value pair separator candidate and the at least one parameter separator candidate comprises determining if any of the at least one name/value pair separator candidates or any of the at least one parameter separator candidates is at the beginning of the two or more strings of data.

6. The method of claim 1, wherein the one or more rules for filtering the at least parameter separator candidates comprises determining if any of the at least one parameter separator candidates is equal to any of the at least one name/value pair separator candidates.

7. The method of claim 1, wherein the one or more rules for filtering the at least parameter separator candidates comprises determining if any of the at least one parameter separator candidates occurs in any of the two or more strings of data more often than a number of occurrences of any of the at least one name/value pair separator candidates−1.

8. The method of claim 1, wherein the one or more rules for filtering the at least parameter separator candidates comprises determining if two or more of the at least one name/value pair separator candidates occurs before any of the at least one parameter separator candidates.

9. A computer program product comprising:
a non-transitory tangible storage medium readable by a processing circuit and storing instructions for execution by the processing circuit for performing a method comprising:
receiving two or more strings of data, each of the two or more strings of data including at least one separator;
selecting, on the computer, at least one name/value pair separator candidate from the two or more strings of data;
filtering the at least one name/value pair separator candidate using one or more rules, the filtering removing any of the at least one name/value pair separator candidates that do not conform to any of the one or more rules;
selecting at least one parameter separator candidate from the two or more strings of data;
filtering the at least one parameter separator candidate using one or more rules, the filtering removing any of the at least one parameter separator candidates that do not conform to any of the one or more rules; and
creating a set of tuples, each tuple in the set of tuples comprising a remaining name/value pair separator candidate, and a remaining parameter separator candidate wherein the remaining name/value pair separator candidate remains after the filtering, on the computer, the at least one name/value pair separator candidate using the one or more rules;
wherein the remaining parameter separator remains after the filtering, on the computer, the at least one parameter separator candidate using the one or more rules.

10. The computer program product of claim 9, wherein the two or more strings of data are character strings of data containing one or more unknown separators, and the two or more strings of data are data submitted to a web application over a network connection.

11. The computer program product of claim 9, wherein the selecting comprises using a difference algorithm to identify one or more characters in common between each of the two or more strings of data.

12. The computer program product of claim 9, wherein the one or more rules for filtering the at least one name/value pair separator candidate and the at least one parameter separator candidate comprises determining if the any of the at least one name/value pair separator candidates or the at least one parameter separator candidate is one of a letter, and a number.

13. The computer program product of claim 9, wherein the one or more rules for filtering the at least one name/value pair separator candidate and the at least one parameter separator candidate comprises determining if any of the at least one name/value pair separator candidates or any of the at least one parameter separator candidates is at the beginning of the two or more strings of data.

14. The computer program product of claim 9, wherein the one or more rules for filtering the at least parameter separator candidates comprises determining if any of the at least one parameter separator candidates is equal to any of the at least one name/value pair separator candidates.

15. The computer program product of claim 9, wherein the one or more rules for filtering the at least parameter separator candidates comprises determining if any of the at least one parameter separator candidates occurs in any of the two or more strings of data more often than a number of occurrences of any of the at least one name/value pair separator candidates−1.

16. The computer program product of claim 9, wherein the one or more rules for filtering the at least parameter separator candidates comprises determining if two or more of the at least one name/value pair separator candidates occurs before any of the at least one parameter separator candidates.

* * * * *